Figure 1:
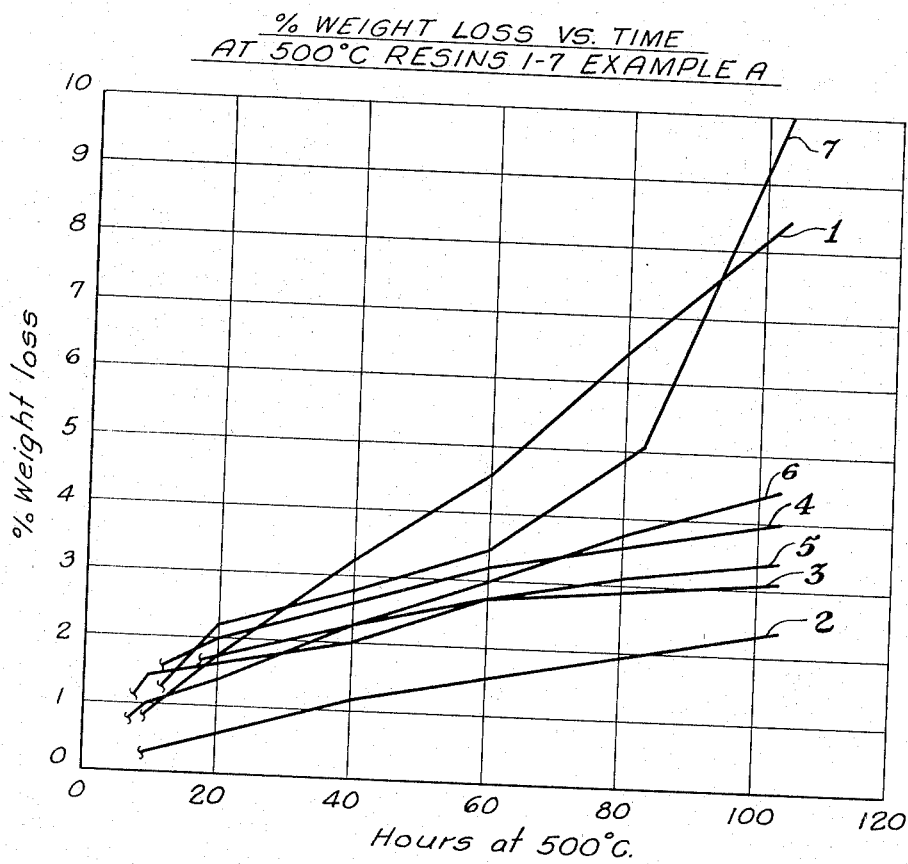

United States Patent Office 3,316,140
Patented Apr. 25, 1967

3,316,140
THERMOSETTING RESINS PREPARED BY REACTING FORMALDEHYDE WITH THE REACTION PRODUCT OF A PHENOL WITH CHLOROMETHYLATED DIPHENYL OXIDE
Lawrence F. Sonnabend, Midland, Mich., assignor to The Dow Chemical Company, Midland, Mich., a corporation of Delaware
Filed Apr. 3, 1963, Ser. No. 270,247
5 Claims. (Cl. 161—198)

The present invention is a continuation-in-part of my prior application filed Aug. 3, 1959, Ser. No. 831,002 entitled, New and Use Copolymers, now U.S. Patent No. 3,128,259 entitled, Synthetic Resins Containing Phenolic Hydroxyl Groups. The present invention relates to a novel and useful class of thermosetting resins, to the method for their preparation and to their use in laminations, moldings and protective coatings. More particularly the present invention concerns a class of thermally stable resins having high flexure and tensile strengths at elevated temperatures and which have also excellent dielectric properties.

It has now been found that if one replaces part or all of the conventional phenol of a phenol-formaldehyde resin with a phenolic body having the average generic formula

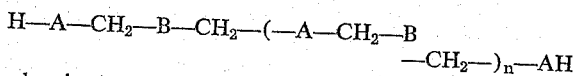

wherein A represents a divalent aromatic radical of the benzene series which bears a phenolic hydroxyl group, and wherein the two valences are in positions ortho or para to said hydroxyl group, n represents an integer from 0 to 6, and B represents a diphenylene ether radical, there is obtained a resin which has greater thermal stability and greater flexure and tensile strengths at elevated temperatures than can be obtained with the commercial phenol-formaldehyde resins. These new resins are the products of catalyzed (preferably alkaline catalyzed) reactions between formaldehyde or formaldehyde-yielding substances, such as hexamethylene tetramine or paraformaldehyde, and a phenolic body prepared by condensing a hydroxy aromatic compound with a chloromethylated diphenyl oxide (chloromethylphenyl ether). The foregoing reaction can also include as a modifying agent from 0 to 150% by weight of phenol, based on the phenolic body. The preparation of the resins of the present invention is readily carried out under conditions normally employed in preparing phenol-formaldehyde resins, that is, heating the reactants at a temperature from about 50° to about 100° C. for ¼ to 4 hours or until the stroke cure of the resin is between about 250 and 90 seconds at 150° C. after neutralization with $CO_2$. The viscosity of the neutralized product measured at 25° C. as a 60% solids in 40% by weight ethanol-60% by weight toluene solvent will approach 100–200 centipoises. The product after neutralization is preferably dehydrated by heating under reduced pressure to about 50 to 80% solids, then diluted for use with organic volatile solvents such as toluene, ethanol or the like.

The reactants which produce the improved resin of the present invention are conveniently employed in a ratio of one mole of formaldehyde for each two active hydrogens in the phenolic body and the phenol. More or less formaldehyde can be employed so long as there is provided at least about 1 mole of formaldehyde for each mole of phenolic body and phenol. An amount of formaldehyde in excess of that which will theoretically react with each active hydrogen of the phenolic body and the phenol is not detrimental but serves no useful purpose.

The formaldehyde-yielding material is chosen from formaldehyde, paraformaldehyde and hexamethylene tetramine for commercial and economic reasons.

The catalysts or condensing agents are preferably the alkaline catalysts, for example the alkali and alkaline earth metal hydroxides or hydrates, and ammonia or amines, although other well known condensation catalysts for the phenol-formaldehyde resin reaction can be employed, such as acid catalyst, etc.

The phenolic body is prepared in accordance with my copending application Ser. No. 831,002, filed Aug. 3, 1959, now U.S. Patent 3,128,259 entitled "New and Useful Copolymers."

The class of condensates which produce with formaldehyde the resin of the present invention have the characteristic general formula

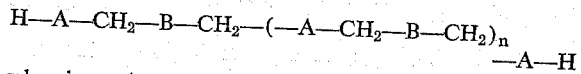

wherein —A— represents a divalent aromatic radical of the benzene series which bears a phenolic hydroxyl group and wherein the two valences are in positions ortho or para to said hydroxyl group, n represents an integer from 0 to 6, and, wherein B represents diphenylene ether radical. The radical A can be represented as a member selected from the group consisting of divalent radicals having the formula

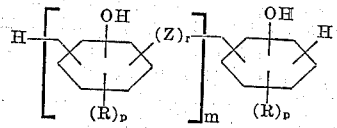

wherein Z represents oxygen, alkylidene, or $—SO_2—$, r represents an integer of from 0 to 1, inclusive, m represents an integer from 0 to 5, inclusive, R represents a member selected from the group consisting of lower alkyl radicals, bromine, chlorine, and phenyl, and p represents an integer from 0 to 2.

The condensate conveniently can be prepared by reacting a hydroxylated aromatic compound of the class hereafter defined with poly-(chloromethyl) diphenyl oxide at a temperature of from about 50° C. to about 150° C. until the evolution of hydrogen chloride has substantially ceased. The ratio of reactants is not critical, some of the desired product being produced with any ratio. However, when less than stoichiometric quantities of either component are employed assuming two reactive positions on the phenol reactant, the terminal moiety of the condensate will be that moiety resulting from the component employed in excess. It is preferable in most instances to employ an excess of the hydroxylated aromatic compound since a more desirable compound is obtained when the terminal moieties contain the aromatic hydroxyl group. Good yields of the desired product are obtained when the hydroxylated aromatic reactant is employed in at least a slight excess over stoichiometric quantities. However, the hydroxylated reactant may be employed in amounts from .8 to 10 moles per mole of chloromethylated diphenyl oxide. Upon completion of the reaction, the unreacted reactants are removed by conventional means such as distillation under reduced pressure, or the like.

The hydroxylated aromatic compounds which can be used as starting materials are those phenolic compounds which have at least two hydrogen atoms on the aromatic nucleus in positions activated by the phenolic hydroxyl group and are free of substituents other than halogen, alkyl or phenyl. Such aromatic compounds include phenol, the halophenols, such as monochlorophenols, the dichlorophenols having two active hydrogens, the alkylphenols, such as ethylphenol, octylphenol, p-tert-butylphenol; the cycloaliphatic phenols such as cyclohexylphenol; the cresols, such as o-cresol, p-cresol, m-cresol; the bisphenols, such as diphenol, bisphenol A, bisphenol B, bis(p-hydroxyphenyl)methane, bis(o-hydroxyphenyl)-methane, 2,2-bis(2,6-dichloro-4-hydroxyphenyl)propane, and the like, and the diphenyl ethers such as bis(p-hydroxyphenyl) ether and the like, and the nuclear mono-, di-, and polyhalogenated alkylated and arylated derivatives thereof which have two active hydrogens.

The chloromethylated diphenyl oxide compounds which can be employed in accordance with the present invention are the mono, di, tri and tetra(chloromethylated) diphenyl oxides, including the nuclear halo-, alkyl-, alkoxy-, and phenyl-substituted compounds, such as bis-(chloromethyl-p-tert-butylphenyl) oxide, bis(chloromethylchlorophenyl) oxide, bis(chloromethyl-p-methoxyphenyl) oxide, bis(chloromethyl-p-phenylphenyl) oxide, and the like.

The following examples illustrate the present invention but are not to be construed as limiting:

EXAMPLE A

*Resin No. 1.—Conventional phenol-formaldehyde resin (Ba(OH)$_2$ catalyzed)*

188 grams of phenol (2 moles), 405 grams of 37% formaldehyde (5 moles) and 10 grams of barium hydroxide octahydrate were charged into a 1 liter flask equipped with agitator, thermometer and condenser. The system was heated at 75° C. for about 4 hours. The resin was neutralized with diluted sulfuric acid. The resin was dehydrated under reduced pressure to about 75% solids.

*Resin No. 2.*—A phenol-chloromethylphenyl ether condensate was prepared by the following method:

2570 grams of phenol was charged into a 5 liter flask equipped with agitator, thermometer and condenser, heated to 90° C. and 1600 grams of a chloromethylphenyl ether analyzing 17.5% chlorine was added over a 2.5 hour period. Upon completion of the reaction excess phenol was removed under a reduced pressure of about 2 cm. Hg at 170° C. As a result of these operations there was obtained 3926 grams of condensate.

100 grams of the above condensation product, 188 grams of phenol, 288 grams of 37% formaldehyde and 5 grams of barium hydroxide octahydrate were reacted as described in the preparation of Resin No. 1, then dehydrated to about 75% solids.

*Resin No. 3.*—A phenol-chloromethylphenyl ether condensation product was prepared by the following method:

8000 grams of phenol was charged into an 18 liter resin reactor equipped with agitator, thermometer, condenser and dropping funnel. The system was heated to 90° C. and 4200 grams of chloromethylphenyl ether having an average of 2 chloromethyl groups per mold was added in about 1.5 hours. Upon completion of the reaction excess phenol was removed under reduced pressure at about 175° C. Yield was 5700 grams. Properties were:

Molecular weight _____ 475
Durrans softening point _____° C__ 56
Chlorine (percent) _____ 0.01

Then 5000 grams of above product, 870 grams of paraformaldehyde (90.5% formaldehyde), 132.5 grams of barium hydroxide octahydrate, 358 grams of water and 500 grams of toluene were charged into a 5 gallon nickel kettle. The system was heated at 75–80° C. for about 2 hours. The reaction mixture was neutralized with carbon dioxide and the water was removed by heating at about 70° C. under reduced pressure. The product was diluted to about 60% resin solids with solvent made up of 60% of toluene and 40% of ethanol. The resin solution was filtered to remove insoluble material. The properties of the resin solution were:

pH _____ 7.3
Ash (percent) _____ 0.068
Viscosity—200 centipoises at 25° C.

Several resins were prepared by mixing various amounts of Resin No. 1 with Resin No. 3. Resin No. 4 was prepared by mixing 25% by weight of Resin No. 1 with 75% by weight of Resin No. 3. In like manner a resin consisting of 50% by weight each of Resins 1 and 3 was prepared, this resin blend is Resin No. 5. Resin No. 6 was prepared by blending 75% Resin No. 1 and 25% Resin No. 3. All percentages are based on the solids content of the resin solutions.

*Resin No. 7.—Conventional phenol-formaldehyde resin (NaOH catalyzed)*

This resin was prepared by heating a solution of 1 mole of phenol per 1.45 moles of 37% formaldehyde and 1% of sodium hydroxide, based on the weight of the phenol, at 60–65° C. for 6 hours. The resin was dehydrated to about 70% solids under reduced pressure.

*Heat Stability Tests.*—1–1.2 grams (solid basis) of each resin were weighed into 2-inch aluminum moisture-determination dishes. The resins were cured by heating 24 hours at 150° C. The dishes were transferred to a high temperature oven and the temperature raised to 260° C. in about 8 hours. After one hour at 260° C. the resins were weighed to determine the weight of the cured resin.

Figure 2:
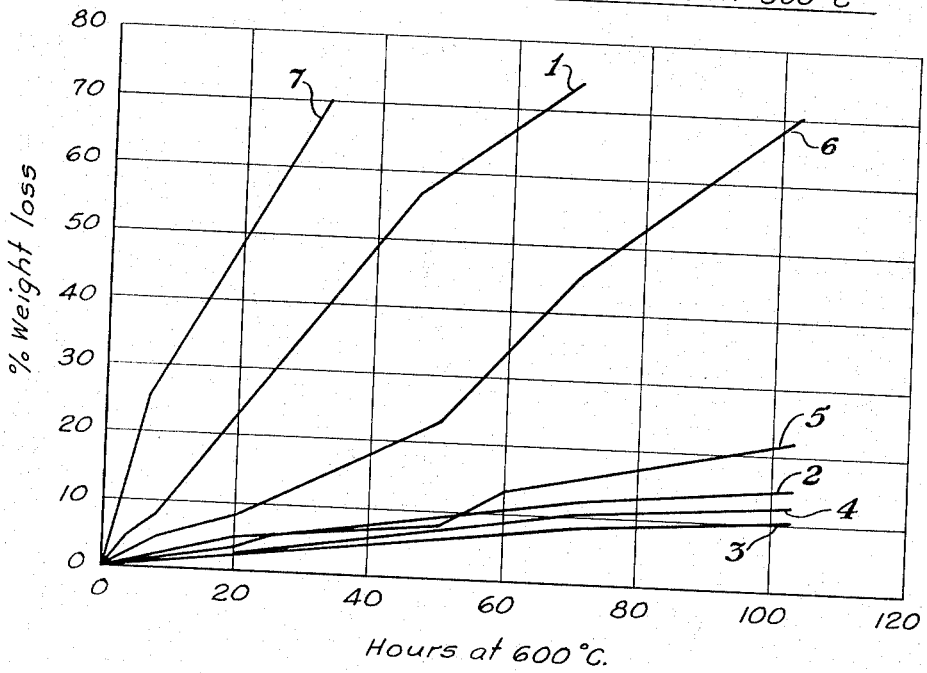
Figure 3:
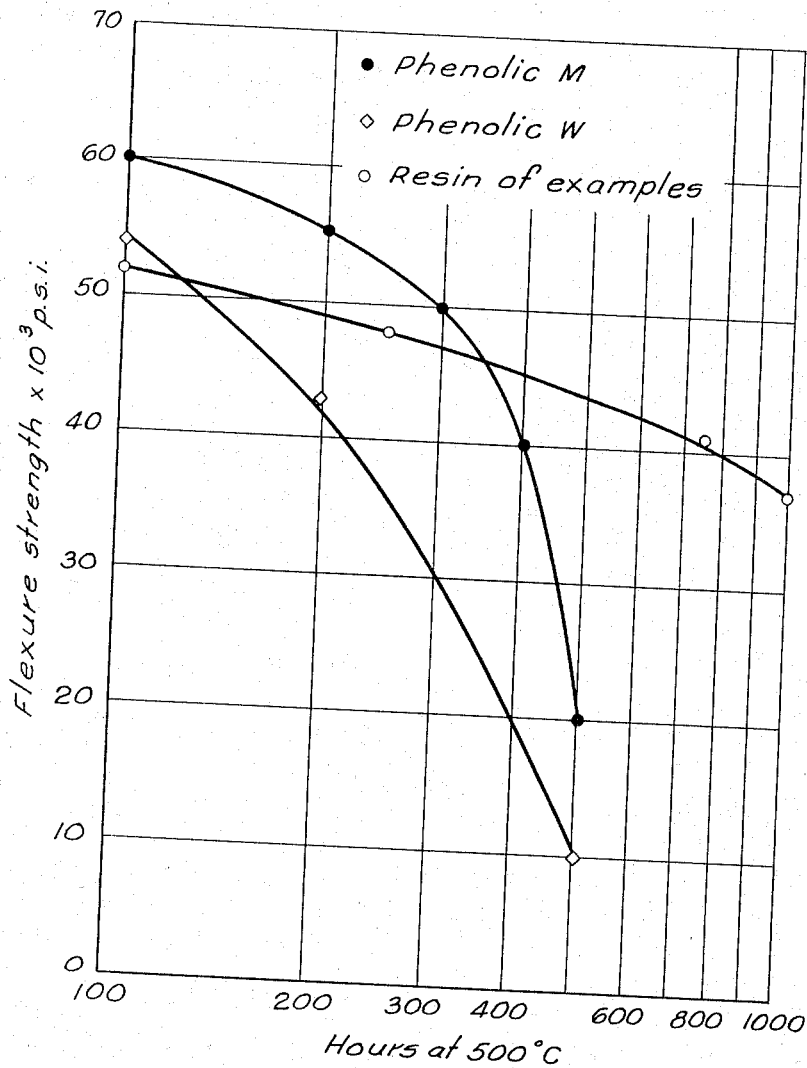

The samples were weighed several times over the 103 hours exposure period and loss of weight calculated. FIGURE 1 shows the plot of percent loss in weight vs. time at 260° C. (500° F.). FIGURE 2 shows a plot of percent weight loss on continuation of the heating test wherein the temperature of the oven was raised to 316° C. (600° F.) for an additional period and the loss in weight determined, using the weight of each resin at the end of the 500° F. test as the starting weight in the 600° F. test. FIGURE 3 shows a comparison of the flexure strengths of the resins of the present invention with two conventional high temperature resins whose curves were taken from High Temperature Plastics, Brenner, Lum and Riley, Reinhold Publishing Corp., Chapter 3, pp. 53–81 (1962).

The test results show the products of this invention have better resistance to degradation at high temperatures for longer periods of time than the phenolformaldehyde resin.

EXAMPLE B

Glass cloth, style 181, finish A–1100, was impregnated with Resin No. 3 to a resins solids pickup of 36.5% total weight of glass resin. The cloth was dried at 25° C. for about 60 hours and then at 125° C. for an additional 7 minutes. A laminate was made from 12 plies of the impregnated cloth by heating 30 minutes at 150° C.

and 300 p.s.i. The laminate was post-cured by heating to 254° C. in about 30 hours and then held at 254° C. for an additional 5 hours. The laminate was cut in half and one section was heated at 260° C. for 100 hours. This section lost 0.54% in weight during this period. Properties of the laminate before and after the heat treatment are shown in Table I.

TABLE I

| | Before Heating | After 100 hrs. at 260° C. |
|---|---|---|
| Flexural strength at 77° F., p.s.i. | 69,500 | 58,300 |
| Flexural modulus at 77° F. | 3.44×10⁶ | 3.25×10⁶ |
| Flexural strength at 500° F., p.s.i. | 47,700 | 47,500 |
| Flexural modulus at 500° F. | 3.14×10⁶ | 3.23×10⁶ |

EXAMPLE C

The resins of the present invention have been employed to treat and impregnate glass cloth and paper and prepare laminates in the manner of Example B. The following table illustrates the method and results achieved, when the Resin No. 3 of Example A was tested according to recognized tests listed, after preparation as described in Example B.

DATA COMPILED USING EXAMPLE A, RESIN NO. 3

| Electrical Data | Cycles | Glass | Paper |
|---|---|---|---|
| Dielectric Constant K: | | | |
| Cond. A ᵃ/D ᵃᵇ | 60 | 5.44/5.78 | 4.82/5.28 |
| | 10³ | 5.42/5.60 | 4.71/4.94 |
| | 10⁶ | 5.28/5.33 | 4.38/4.51 |
| 23° C./75° C. | 60 | 5.94/5.80 | |
| | 10³ | 5.82/5.70 | |
| | 10⁵ | 5.68/5.60 | |
| 150° C./200° C.ᶜ | 60 | 5.07/6.33 | |
| | 10³ | 5.77/5.84 | |
| | 10⁵ | 5.62/5.59 | |
| Dissipation Factor: | | | |
| Cond. A ᵃ/D ᵃᵇ | 60 | .0096/.028 | .021/.070 |
| | 10³ | .006/.015 | .011/.023 |
| | 10⁶ | .011/.012 | .028/.029 |
| Cond. A ᵃ 23° C./75° C. | 60 | .0096/.010 | |
| | 10³ | .0061/.006 | |
| | 10⁵ | .0065/.0045 | |
| 150° C./200° C. | 60 | .033/.072 | |
| | 10³ | .013/.020 | |
| | 10⁵ | .0047/.007 | |
| Volume Resistivity ᵈ Cond. A/D (×10¹⁰) | | 62/1.3 | 73/1.3 |
| Dielectric Strength: ᵉ | | | |
| Cond. A/D avg. KV Volts/Mil | | >50.4/50.4 | >52.2/58.6 |
| Arc Resistance | | 462/434 | 596/559 |
| | | 136 | 85 |

ᵃ Cond. A—23° C. at 50% R.H. for 24 hours; Cond. D—48 hours immersion in water at 50° C.
ᵇ ASTM Test No. D150.
ᶜ These data were obtained at the temperature indicated after conditioning the test sample at 23° C. at 50% relative humidity. In all respects the tests were conducted as prescribed by the ASTM Test Procedures first indicated.
ᵈ ASTM Test No. D257.
ᵉ ASTM Test No. D149.

SATURATING VARNISH

| | |
|---|---|
| Solvent | Toluene/Alcohol Mixture. |
| Viscosity at 60% Solids | 200 cps. |
| Viscosity at 50% Solids | 40 cps. |
| Gel Time at 300° F | 160 sec. |
| Gel Time at 250° F | 12 min. |

IMPREGNATION AND LAMINATING DATA

| Substrate | 181 Glass Cloth | 10 mil Cotton Linter Paper. |
|---|---|---|
| Pretreatment | A-1100 | (ᶠ) |
| Solids Pickup | 36.5% | 63.0%. |
| Drying Schedule | 48 hours at 77° F | 48 hours at 77° F. |
| B-staging | 7 min. at 255° F | 7 min. at 255° F. |
| Press Temperature | 300° F | 300° F. |
| Pressure | 300 p.s.i | 800 p.s.i. |
| Press Time | 30 min | 30 min. |
| Cooling Cycle | 10 min. to 200° F | 10 min. to 200° F. |
| Post Cure | 2 hours at 250° F.; 2 hours at 300° F.; 2 hours at 350° F.; 2 hours at 400° F. | 1 hour at 350° F. 1 hour at 350° F. |

ᶠ PF Paper is first impregnated with phenolic resin 15% solids.

| Laminate Data | Glass | Paper |
|---|---|---|
| Ply | 12 | 10. |
| Resin Content | 34% | 61%. |
| Flexure at 77° F./Modulus ᵍ | 74,000/3.54×10⁶ | 23,000/1.29×10⁶. |
| Flexure after 2 hrs. boil/Modulus | 74,000/3.43×10⁶ | 23,000/1.21×10⁶. |
| Flexure at 300° F./Modulus | 62,000/4.19×10⁶ | |
| Flexure at 500° F./Modulus | 23,000/2.40×10⁶ | 8,500/0.61×10⁶. |
| Tensile at 77° F./Modulus ʰ | 54,000/3.01×10⁶ | 13,000/1.01×10⁶. |
| Edge Compression ⁱ | 55,000 | 25,000. |
| Edge Compression after 2 hr. boil | 49,000 | |
| Izod Impact (notched) ʲ | 17 | 0.30. |
| Water absorption: | | |
| 24 hrs ᵏ | 0.06% | 0.12%. |
| 1 week | 0.14% | 0.52%. |
| 2 hrs. boil | 0.07% | 0.34%. |
| Flame Test ˡ | Self extinguishing | Self extinguishing. |
| Barcol Hardness | 75 | |

ᵍ ASTM Test No. D790.
ʰ ASTM Test No. D636.
ⁱ ASTM Test No. D695.
ʲ ASTM Test No. D256.
ᵏ ASTM Test No. D570.
ˡ ASTM Test No. D635.

EXAMPLE D 352.5 grams of phenol (3.75 moles) was heated to 70° C. and 667.5 grams (2.5 moles) of 4,4'-bis(chloromethylphenyl) oxide dissolved in 612 grams of toluene was added over 1.5 hours with stirring. During the addition the reaction mixture was maintained at 70°–80° C. with external cooling. The volatiles were removed under vacuum with final conditions being 180–182° C. at 2.5 cm. Hg for 30 minutes to obtain 790 grams of a resinous material having a melting point 90.5° C. and a chlorine content of .01%.

EXAMPLE E 189.5 grams of the product of Example D was dissolved in 600 grams of toluene and 10.5 grams of hexamethylenetetramine and 200 grams of wood flour were added. The mixture was dried in a vacuum for 18 hours at 60–70° C. The dry powder was molded at 150° C. and about 4800 p.s.i.

A commercially available phenol-formaldehyde resin was mixed with hexamethylenetetramine and wood flour and molded in the foregoing manner. Comparison of the two resins was made by boiling 2 x ½ x ⅛ inch test strips out from each of the moldings in one-tenth normal sodium hydroxide. Results of these tests are in the following table.

| No. | Time in Hours | Percent Change in Weight | Appearance and Remarks |
|---|---|---|---|
| 6A | 4 | | Sample had began to swell, surface very rough. |
| | 30 | +59 | Severely swollen, sample had cracked. |
| | 96 | +73.7 | Severely cracked and swollen, very dark color. |
| 6B | 4 | | Very slight blemish on surface. |
| | 30 | +31 | Slight swelling, very light blemish. |
| | 96 | +30 | Slight swelling, sample still in good condition. |

Sample identification: 6A—Phenol-formaldehyde resin; 6B—Phenol-chloromethylated DPO resin.

I claim:

1. A method for preparing a thermosetting resin which comprises reacting together for between about ¼ and 4 hours at a temperature of from about 50 to about 100° C. a formaldehyde-yielding material with at least two phenolic activated hydrogens in (A) a phenolic compound derived by condensing (1) from 1 to 10 moles of a hydroxy aromatic compound having the formula

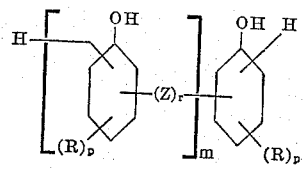

wherein Z represents a radical selected from the group consisting of oxygen, —SO₂— and alkylidene, r represents an integer from 0 to 1, m represents an integer from 0 to 5, R represents a member selected from the group consisting of lower alkyl radicals, bromine, chlorine, and phenyl, and p represents an integer from 0 to 2, and provided that at least two of the positions ortho and para to a hydroxyl are free of substituents, with (2) a chloromethylated diphenyl oxide having the formula

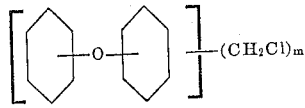

wherein m represents an integer from 1 to 4 and (B) from 0 to 150% by weight of a phenol, having at least two reactive hydrogens, based on the phenolic compound.

2. A thermoset resin comprising the reaction product of from 1 to 4 moles of formaldehyde, derived from a formaldehyde-yielding material, per mole of (A) a condensation product of 1 mole of bis(chloromethylated) diphenyl oxide and 1 to 10 moles of phenol having at least two of the positions ortho and para free of substituents and (B) from 0 to 150% by weight of (A) of phenol, the reaction to obtain the reaction product being carried out at a temperature of from about 50° to about 100° C. for from about ¼ to about 4 hours.

3. A resin composition comprising the resin of claim 1 dissolved in a volatile organic solvent.

4. A laminate prepared by impregnating a plurality of strata with the resin of claim 2 and heating the same under pressure of at least 200 p.s.i. and at from about 100° C. to about 300° C. for from ½ to 80 hours.

5. A method for preparing a thermosetting resin which comprises reacting, for a time sufficient to produce a resinous product having a stroke cure of between about 250 and 90 seconds at 150° C. after neutralization with CO₂, together for between about ¼ and 4 hours at a temperature of from about 50 to about 100° C., a formaldehyde-yielding material with at least two phenolic activated hydrogens in (A) a phenolic compound derived by condensing at a temperature of from about 50° to about 150° C. (1) from 1 to 10 moles of a hydroxy aromatic compound having the formula

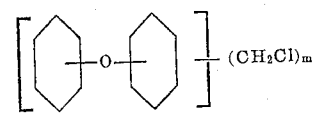

wherein Z represents a radical selected from the group consisting of oxygen, —SO₂— and alkylidene, r represents an integer from 0 to 1, m represents an integer from 0 to 5, R represents a member selected from the group consisting of lower alkyl radicals, bromine, chlorine, and phenyl, and p represents an integer from 0 to 2, and provided that at least two of the positions ortho and para to a hydroxy are free of substituents, with (2) a chloromethylated diphenyl oxide having the formula wherein m represents an integer from 1 to 4 and (B) from 0 to 150% by weight of a phenol, having at least two reactive hydrogens, based on the phenolic compound.

References Cited by the Examiner

UNITED STATES PATENTS

| | | | |
|---|---|---|---|
| 2,025,538 | 12/1935 | Kienle et al. | 18—55 |
| 2,448,357 | 8/1948 | Craig et al. | 154—138 |
| 2,465,299 | 3/1949 | Wachter | 154—43 |
| 2,473,145 | 6/1949 | Hesselbart | 260—57 |
| 2,482,142 | 9/1949 | Chidester et al. | 154—45.9 |
| 3,128,259 | 4/1964 | Sonnabend | 260—18 |
| 3,169,939 | 2/1965 | Cordts et al. | 260—38 |

OTHER REFERENCES

Ellis, Chemistry of Synthetic Resins, volume I, page 327.

SAMUEL H. BLECH, *Primary Examiner.*

WILLIAM H. SHORT, *Examiner.*

H. E. SCHAIN, *Assistant Examiner.*